Patented Aug. 11, 1936

2,050,931

UNITED STATES PATENT OFFICE 2,050,931

PRELIMINARY PROCEDURE FOR CONDITIONING WELLS

Melvin De Groote, St. Louis, Mo., assignor to Tretolite Company, Webster Groves, Mo., a corporation of Missouri No Drawing. Application February 17, 1936, Serial No. 64,346

6 Claims. (Cl. 166—21)

This invention relates to processes of the kind that are used for increasing the productivity of deep wells, such as oil wells, gas wells, water wells and brine wells.

When an oil well is drilled into an oil-bearing stratum, the release of pressure upon the oil deposit may cause the oil to flow naturally for a certain period of time, after which the volume of flow will, in most instances, gradually decrease to a point or degree where some procedure, such as pumping, must be employed, so as to insure the production of a profitable amount of oil. Thereafter, production may continue to decline until the quantity of oil obtained from the well is so small that it is not commercially practicable to continue the well in operation. In some instances the stoppage of oil output or decline in production, above referred to, is not caused by exhaustion of the oil supply, but, on the contrary, is caused by building up of solid deposits of wax, or of inorganic salts, in the channels or pores of the oil-bearing rock. The productivity of wells of the kind above mentioned may, in some instances, be wholly, or at least partially, regenerated by mechanical means, such as the use of an explosive, but there are various objections to such mechanical treatment, such as the high cost and danger of injuring the internal well structure itself.

In such instances where the hydrocarbon gases, escaping from a well, lower the solubility of wax or paraffin bodies in the oil, with the result that wax or paraffin-like bodies are deposited in the oil-bearing stratum, one is confronted with considerable difficulty in attempting to remove such wax or paraffin-like bodies, due to their chemical inactivity. Asphaltic materials may act the same as wax. Indeed, it is not necessary for the oil-bearing strata to be clogged entirely with wax or paraffin-like bodies, but, on the contrary, a mere coating or film of wax or paraffin on calcareous matter sometimes prevents ordinarily effective acid-treating agents, such as hydrochloric acid, from combining with or removing the calcareous deposit, and thus presents the same sort of difficulty. The present invention consists of a preliminary procedure for conditioning wells, and involves the removal of such films of wax, paraffin-like bodies, or similar matter, from calcareous deposits, or siliceous structures, so as to render said deposits or structures susceptible to treatment with hydrochloric acid or hydrofluoric acid, generated in situ, or such other acid treating agents as may be employed. Before describing the process in detail, it may be well to point out the general features involved in hydrofluoric acid treatment, as well as the treatment involving the generation of hydrofluoric acid in situ.

There are a number of methods or processes, involving the use of hydrochloric acid, that are effective for treating a clogged oil-bearing stratum consisting of a lime sand, a limestone, or a formation related to calcareous or magnesian formation, provided the clogging is due essentially to uncoated calcium carbonate or magnesium carbonate or the like. This is also true in such siliceous or similar strata, from which petroleum oil is derived, where there is a clogging of the oil sands, due to the presence of alkaline earth carbonates, and primarily calcium carbonate. It is believed that the subterranean water becomes saturated with calcium bicarbonate under pressure, and that when the well is drilled and pressure released, some of the subterranean water escapes with the oil, with the result that the solubility of the calcium carbonate or bicarbonate in the remaining subterranean water becomes reduced to such an extent or degree that precipitation takes place in the pores of the siliceous sand in the oil-bearing stratum. So far as the usual hydrochloric acid treatment is concerned, it is immaterial whether the formation itself is truly calcareous or argillaceous, or is a siliceous formation with a calcareous deposit. Naturally, magnesium carbonate deposits are susceptible to treatment as calcium carbonate deposits.

Obviously, if hydrochloric acid treatment is applied to an oil-bearing limestone formation, it may not only remove any deposited calcium carbonate or the like, but it may increase the porosity of the limestone structure itself. Therefore, in actual use, the increased productivity is not limited to the removal of the relatively recent calcium deposit, but it may also be concerned with the increased natural porosity of the aged oil-bearing stratum itself. Some oil-bearing strata are not essentially calcareous in character, but may essentially be siliceous in character, or else, may represent limestone so high in siliceous content that there is limited or no chemical reactivity towards hydrochloric acid.

It is well known, of course, that hydrofluoric acid attacks silica, with the resultant production of water and silicon tetrafluoride, the latter being a gas. Commercial efforts have been made to use hydrofluoric acid to increase the production of oil wells. Hydrofluoric acid, of course, could be emulsified so as to produce a hydrofluoric acid in oil emulsion in the manner described in U. S. Patent No. 1,922,154, dated April 15, 1933, to Melvin De Groote. Another method is to employ a salt of hydrofluoric acid, such as sodium fluoride, which is non-corrosive, and permits reactions to take place with a suitable acid, such as hydrochloric acid or nitric acid in situ. Such a process is described in U. S. Patent No. 1,990,969, dated February 12, 1935, to Wilson. Another method, described in my pending application for patent Serial No. 55,614 filed December 21, 1935, employs a solution of sodium fluoride or suspension of sodium fluoride, or any other suitable fluoride, such as calcium fluoride, in the form of an emulsion, so as to produce a water-in-oil emulsion admixed with another emulsion of hydrochlofic acid in oil. Such an emulsion contains two different internal phases, one an aqueous sol or suspension of sodium fluoride, and the other being aqueous hydrochloric acid, which do not re-act until the emulsion is injected into the stratum and breaks, due to the capillarity of the structure.

In view of what has been said previously, it is obvious that the success of an acid treating process depends upon the ability of the acid to contact the material to be removed, i. e., the deposits of calcium carbonate, magnesium carbonate, or silica. If the calcium carbonate, magnesium carbonate, or siliceous structure is covered with an oily or wax-like body, successful treatment becomes questionable. The present process consists of an improvement on older processes, and is intended primarily for use in conjunction with strata which appears to be coated with a film of waxy, asphaltic, or paraffin-like bodies. Briefly described, the present process consists in dissolving an oil and water-soluble wetting agent, which is preferentially water-soluble, such as a petroleum sulfonate, in an oily liquid, such as crude oil, gasoline or some other suitable solvent, and then forcing the said solution through the area or structure to be subsequently treated with acid. After this first stage of treatment, water, or water with a dissolved water-soluble wetting agent (which may not have any oil solubility whatsoever), is forced through the area being treated. This second stage is then followed by a conventional acid treatment employing hydrochloric acid, hydrofluoric acid generated in situ, or other acid treating agent.

The reagent that is dissolved in the oily liquid to produce the treating solution, has been referred to as water and oil soluble, and preferentially water-soluble. This characterization is meant to indicate the class of materials which have the property of wetting agents, and will dissolve or disperse in either oil or water in the absence of the other kind of a solvent, i. e., they will dissolve in oil in the absence of water, and will dissolve in water in the absence of oil, but if at freedom to do so, they will pass from oil into water, but not from water into oil.

In the past, efforts to remove the waxy film or asphaltic film from the surface to be treated, generally depended upon either one of two procedures, one of which procedures involved passing a solvent such as kerosene, crude oil and gasoline through the area to be subsequently treated, and the other procedure involved flushing said area with an aqueous solution containing a wetting agent of the type which has been employed in recovering oil from depleted oil sands. Reagents of the type last referred to are disclosed in U. S. Patent No. 1,823,439, dated September 15, 1931, to Melvin De Groote; U. S. Patent No. 1,823,440, dated September 15, 1931, to Melvin De Groote and Louis T. Monson; and U. S. Patent No. 1,894,759, dated January 17, 1933, to Melvin De Groote and Arthur F. Wirtel.

The relative ineffectiveness of a solvent is explainable perhaps by an analogy to an adsorbed material on charcoal, and also due to the fact that the surface remains coated with an oily body. If an aqueous solution is clarified by means of charcoal, the material removed from the solution is adsorbed on the charcoal in the same manner that waxy material may be adsorbed from a hydrophobe sol, that is, from the crude petroleum, onto the deposits to be acid treated. If the charcoal with its adsorbed film is washed with water, it will be found that usually the washing process does not remove the adsorbed film, i. e., the previous water-soluble or water-dispersible material does not re-dissolve or re-disperse in water by mere contact with water. Similarly, by analogy, the mere passing of crude oil or kerosene, or some other solvent, through or over the surface to be acid treated, may no longer remove the adsorbed wax or hydrophobe material which may have been at one time rather oil-soluble, or at least, oil-dispersible.

The ineffectiveness of materials, for instance, wetting agents of the kind employed in aqueous solution or as an aquesol for conventional flooding oil sands, is probably explained by the fact that the solution, although having apparently a preferential wetting property, still does not dislodge the adsorbed film, principally because the material employed as a wetting agent is only water-soluble, or, if it is both oil and water-soluble, it will not leave the aqueous solution, or will not pass from the hydrated state into the oily, or perhaps wax-like, film on the adsorbed structure.

However, when a subterranean structure with its adsorbed film of wax or similar material is contacted with an oil and water-soluble wetting agent dissolved in oil, for instance, a petroleum sulfonate derived from a mahogany acid or acids and in the form of a sodium salt, then the oil and water-soluble dispersing agent appears to adsorb from the oily vehicle onto the wax-like material and become a part thereof of the adsorbed layer. Subsequently, when water is forced through the structure, the previously adsorbed wetting agent, although oil-soluble in absence of water, becomes water-soluble, because, as previously stated, it must be of the kind which is preferentially water-soluble. Thus, the adsorbed waxy film or the like is removed, disrupted or dislodged.

The water, which is passed through the structure to wash off or remove the asphaltic film, may contain, if desired, a suitable water-soluble reagent, such as mono-butylated, beta naphthalene, sulfonic acid, ammonium salt. I have found that such treatment as herein described will often cleanse the surface of the structure, so that subsequent treatment with a suitable acid of the kind ordinarily employed in acid treatment, will be readily effective. The reagent, which I prefer to employ in the hydrophobe solution, is a petroleum sulfonate in the form of a sodium salt derived from mahogany acids, because such material is relatively cheap and exhibits an excellent solubility, both in oil and water. Other similar materials may be employed, such as the material obtained by neutralizing the sulfo acid hydrogen of sulfo oleic acid with ammonium hydroxide and esterifying the carboxylic acid hydrogen with a suitable alcohol, such as methyl, ethyl, propyl, or butyl alcohol. Other suitable oil and water-soluble wetting reagents include the amylamine or butylamine salt of propylated or butylated naphthalene sulfonic acids, etc. Other amine salts, such as benzylamine salts, toluidine salts, etc., of various alkylated naphthalene sulfonic acids may be employed.

The percentage of oil and water-soluble wetting agent dissolved in the oil used in the first flushing step, may vary from ½% to 5%, depending upon the reagent employed. I prefer to use crude petroleum oil as the oily vehicle, but kerosene, gasoline, sulfur dioxide extract of the kind obtained in the petroleum refining, solvent naphtha, benzol, tar acid oil, etc., could be used. Similarly, if a water-soluble wetting agent is added to the water used in the second flushing step, the amount may vary similarly, depending upon the kind of the wetting agent employed, but ½% to 5% usually is a reasonable range. In some instances, the productivity of a well may be increased by the flushing procedure or treatment herein described, without subsequent acid treatment, although as a rule, it is more desirable to employ the said treatment immediately after the flushing procedure, so that the surfaces to be attacked by the acid are in clean condition, susceptible to reaction.

Having thus described my invention, what I claim as new and desire to secure by Letters Patent is:

1. A preliminary procedure for conditioning a well, characterized by introducing into the producing stratum a hydrophobe solution of a water and oil-soluble wetting agent which is preferentially water-soluble to the extent that it will not pass from an aqueous phase into an oil phase and is oil soluble only in the substantial absence of water, and thereafter flushing the producing stratum with a suitable aqueous medium.

2. A preliminary procedure for conditioning a well, characterized by introducing into the producing stratum a hydrophobe solution of a water and oil-soluble wetting agent derived from a mahogany petroleum sulfonic acid and being preferentially water-soluble to the extent that it will not pass from an aqueous phase into an oil phase and is oil soluble only in the substantial absence of water, and thereafter flushing the producing stratum with a suitable aqueous medium.

3. A preliminary procedure for conditioning a well, characterized by introducing into the producing stratum a hydrophobe solution of a water and oil-soluble wetting agent derived from an esterified sulfo-oleate and being preferentially water-soluble to the extent that it will not pass from an aqueous phase into an oil phase, and is oil soluble only in the substantial absence of water, and thereafter flushing the producing stratum with a suitable aqueous medium.

4. A preliminary procedure for conditioning a well, characterized by introducing into the producing stratum a hydrophobe solution of a water and oil-soluble wetting agent water-soluble and derived from a higher amine salt of alkylated naphthalene sulfonic acid and being preferentially water-soluble to the extent that it will not pass from an aqueous phase into an oil phase and is oil soluble only in the substantial absence of water, and thereafter flushing the producing stratum with a suitable aqueous medium.

5. A preliminary procedure for conditioning a well, characterized by introducing into the producing stratum a hydrophobe solution of a water and oil-soluble wetting agent which is preferentially water-soluble to the extent that it will not pass from an aqueous phase into an oil phase and is oil soluble only in the substantial absence of water, and thereafter flushing the producing stratum with an aqueous solution of a wetting agent.

6. A preliminary procedure for conditioning a well, characterized by introducing into the producing stratum a hydrophobe solution of a water and oil-soluble wetting agent which is preferentially water-soluble to the extent that it will not pass from an aqueous phase into an oil phase and is oil soluble only in the substantial absence of water, and subsequently flushing the producing stratum with a suitable aqueous medium comprising an aqueous solution of mono-butylated, beta naphthalene, sulfonic acid ammonium salt.

MELVIN DE GROOTE.

CERTIFICATE OF CORRECTION.

Patent No. 2,050,931.   August 11, 1936.

MELVIN DE GROOTE.

It is hereby certified that error appears in the printed specification of the above numbered patent requiring correction as follows: Page 3, second column, line 22, claim 4, strike out the words "water-soluble and"; and that the said Letters Patent should be read with this correction therein that the same may conform to the record of the case in the Patent Office.

Signed and sealed this 6th day of October, A. D. 1936.

Henry Van Arsdale (Seal)   Acting Commissioner of Patents.

CERTIFICATE OF CORRECTION.

Patent No. 2,050,931. August 11, 1936.

MELVIN DE GROOTE.

It is hereby certified that error appears in the printed specification of the above numbered patent requiring correction as follows: Page 3, second column, line 22, claim 4, strike out the words "water-soluble and"; and that the said Letters Patent should be read with this correction therein that the same may conform to the record of the case in the Patent Office.

Signed and sealed this 6th day of October, A. D. 1936.

Henry Van Arsdale (Seal) Acting Commissioner of Patents.